March 25, 1969 L. EGGER 3,435,394
ELECTROMAGNETIC CONTROL DEVICE
Filed May 4, 1966 Sheet 1 of 2
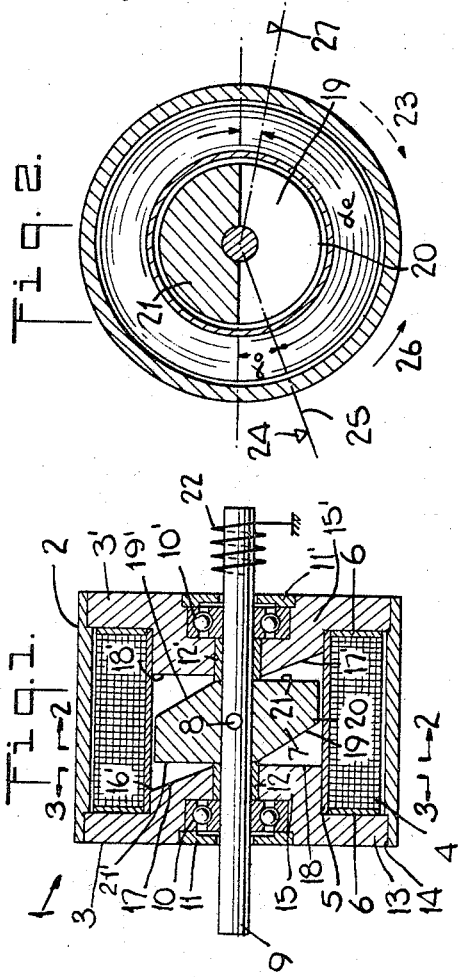
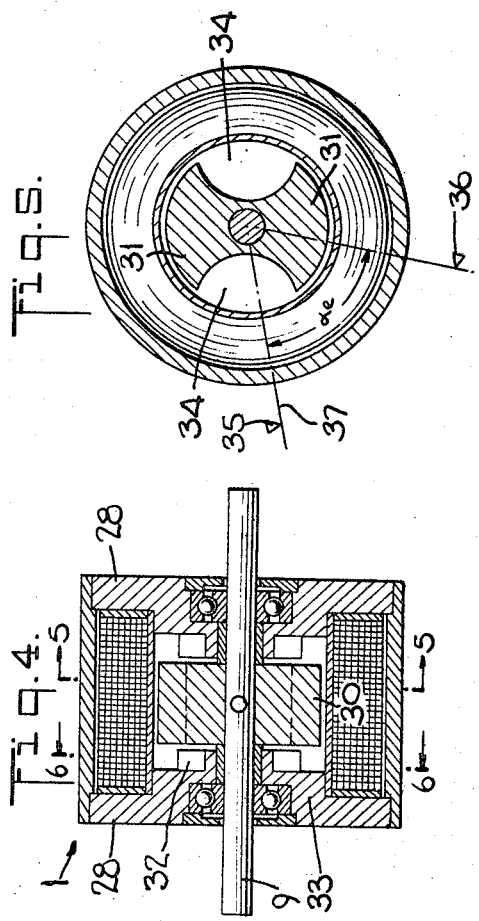
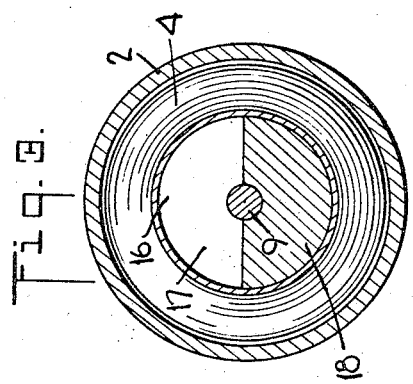
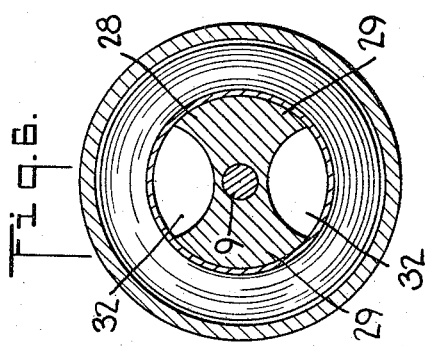
INVENTOR.
LINUS EGGER
BY
ATTORNEYS

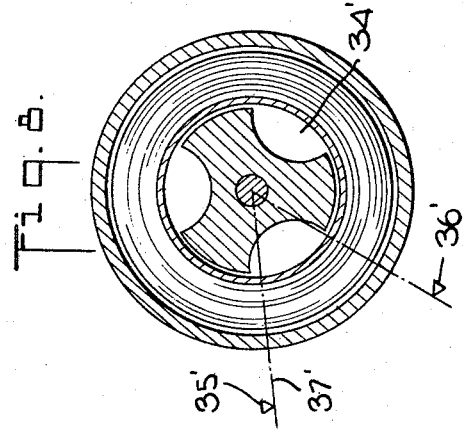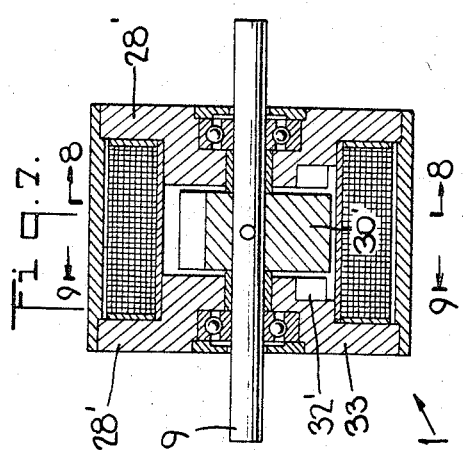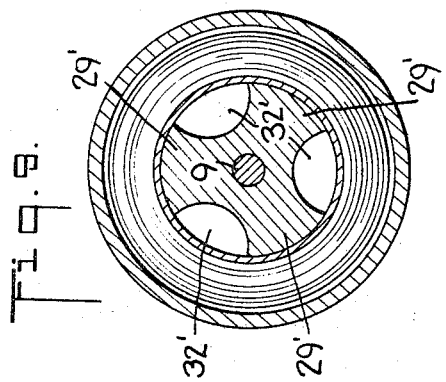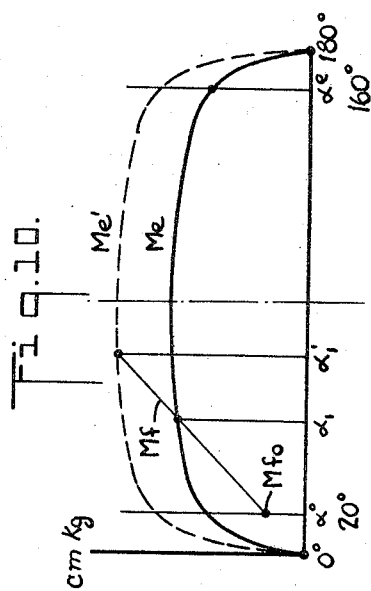

United States Patent Office 3,435,394
Patented Mar. 25, 1969

3,435,394
ELECTROMAGNETIC CONTROL DEVICE
Linus Egger, Uerikon, Seeblick, Switzerland, assignor to Heberlein & Co. A.G., Wattwil, Switzerland, a corporation of Switzerland
Filed May 4, 1966, Ser. No. 547,666
Claims priority, application Switzerland, June 16, 1965, 8,434/65
Int. Cl. H01f 7/08, 7/14; H01h 67/06
U.S. Cl. 335—272      6 Claims

ABSTRACT OF THE DISCLOSURE

Electromagnetic control effecting angular positioning. Electromagnetic includes coil, ferromagnetic core having sleeve surrounding coil and end caps closing the same and rotatable shaft positioned in core. An armature is fixed to shaft and has surfaces opposed each end cap; opposing surfaces of caps and armature are shaped to provide air gap configuration which produce upon constant excitation of coil constant torque over extended range of shaft movement. Spring is provided to bias shaft to prevent rotation; stop means is also provided for positioning shaft in mentioned torque range and for holding against spring. Upon excitation shaft will assume angular position corresponding where torque of shaft equals force of spring.

---

This invention relates to an electromagnetic control device, and more particularly, to such a device wherein a torsional movement is imparted to an armature upon excitation of an electromagnetic core. The present invention is useful in a number of applications in which accurate annular positioning is required such as in step-switches, for example.

In apparatus of the class described, it is known to wind the core and armature coils respectively around those members; and it is also known to arrange poles of the core and those of the armature outside the exciting coil and on one side thereof. These constructions are relatively expensive and are not often used where an electromagnet is employed to move an armature axially in order to derive rotational movement of a driven device. In such known devices, the torsional movement is relatively small at the start and at the end of each excursion, the magnitude of the torsional movement building and diminishing relatively slowly thus rendering it difficult to obtain a stable adjustment of the armature in certain ranges of annular movement between extremes.

By my present invention, I contribute apparatus of the class described which eliminates the foregoing disadvantages and creates a torsional movement which yields a relatively large moment at a relatively small cost in material and space and with a simple inexpensive winding. More importantly, my invention makes it possible to obtain stable adjustments over a relatively large range of annular movement. Thus, I am able to rotate the armature accurately and precisely through a desired angle and bring same positively to a predetermined annular position, within a given range of annular movement, by excitation of the electromagnetic coil.

Essentially, the control device of the present invention comprises a ferromagnetic core of an electromagnet and a ferromagnetic armature having distinct poles which align themselves with each other when the coil of the electromagnet is excited, characterized in that the core of the electromagnet presents a jacket or sleeve and has a cover closing same at each end. A rotatable shaft is positioned axially in the core and through at least one of the end caps. An armature is fixedly mounted to said shaft and has distinct surfaces opposed each of the end caps; the opposing surfaces of the caps and armature each have n distinct poles displaced thereabout every 360/n degrees relative to the shaft and are shaped to provide an air gap configuration which produces upon constant excitation of the electromagnetic coil substantially constant torque over an extended range of shaft angular movement. A spring is provided to bias the shaft to prevent shaft rotation; a stop means cooperable with the shaft is also provided for positioning the shaft in the extended constant torque range and for holding against the urging of the spring. Upon excitation of the electromagnetic coil the shaft will assume an angular position corresponding to where the torque of said shaft equals the oppositely applied force of the spring.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent construction as do not depart from the spirit and scope of the invention.

A specific embodiment of the invention has been chosen for purposes of illustration and description, and is shown in the accompanying drawings, forming a part of the specification, wherein:

FIG. 1 is a longitudinal sectional view through a device of the present invention with a two-pole electromagnet;

FIG. 2 is a cross-sectional view taken along the lines 2—2 of FIG. 1;

FIG. 3 is a cross-sectional view taken along lines 3—3 of FIG. 1;

FIG. 4 is a longitudinal sectional view taken through a device of the present invention having a four-pole electromagnet;

FIG. 5 is a cross-sectional view taken along the lines 5—5 of FIG. 4;

FIG. 6 is a cross-sectional view taken along the lines 6—6 of FIG. 4;

FIG. 7 is a longitudinal sectional view through a device of the present invention with a six-pole electromagnet;

FIG. 8 is a cross-sectional view taken along the lines 8—8 of FIG. 7;

FIG. 9 is a cross-sectional view taken along the lines 9—9 of FIG. 8; and

FIG. 10 is a diagram ploting load against annular distance to illustrate the operation of the present device.

Referring now to FIGS. 1 to 3 of the drawings, there is shown an electromagnet 1 the ferromagnetic core of which consists of a cylindrical sleeve or jacket 2 and two caps or covers 3 and 3' closing the ends of same. Inside the jacket 2, the exciting coil 4 of electromagnet 1 is positioned on a coil support 5 having two annular terminal flanges 6. An electromagnetic armature 7 is located within the coil 4 and is fixed to a shaft 9 by means of a pin 8, the shaft 9 lying in the axis of electromagnet 1. The shaft 9 passes through both covers 3 and 3' and is supported in the same by means of ball bearings 10 the axial position of which is fixed by means of terminal discs 11 and socket 12 and 12'.

The cover 3 is formed with a flange 13 which is in contact with one inner edge 14 of jacket 2 and with flange 6 of coil support 5. The cover 3 defines a pole shoe 15 which projects centrally within the support 5, near the armature 7. The upper part of pole shoe 15, as seen in FIGS. 1 and 3, is inclined along a plane disposed at 70° with respect to shaft 9, whereby the top 16 of its semi-elliptical surface 17 projecting inwardly extends the largest distance from armature 7. The lower part of pole shoe 15, however, is delimited by a plane perpendicular to shaft 9 and of semi-circular form, so that it forms a distinct pole 18. The cover 3' is of exactly the same shape as cover 3, whereby, however, a distinct pole 18' is displaced by 180° with respect to pole 18.

The lower part of armature 7 in FIGS. 1 and 2 presents on its left-hand face a semi-elliptical surface 19 the top 20 of which is furthest from cover 3. The upper part of the left-hand face of armature 7, however, is delimited by a plane perpendicular to shaft 9 and of semi-circular form, so that it forms a distinct pole 21. The right-hand face of armature 7 is exactly similarly shaped to the left-hand face, the distinct pole 21', however, being displace by 180° with respect to pole 21.

In the position of the armature 7 shown in FIGS. 1–3, the distinct poles 18 and 18' of covers 3 and 3' are opposite to the oblique faces 19 and 19' of armature 7, and the distinct poles 21 and 21' of armature 7 are opposite to the oblique faces 17 and 17' of covers 3 and 3', so that the magnetic resistance of magnetic circuit 2, 3, 7, 3' is at its maximum value. Thus, it may be seen that the distinct poles on the opposed surfaces of the armature and end caps are displaced relatively to each other by 360/2n degrees. When armature 7 is rotated 180° the poles 21 and 21' assume the position opposite poles 18 and 18', so that in this case the magnetic resistance of magnetic circuit 2, 3, 7, 3' is at its minimum value. If the electromagnet is excited, the same tends to rotate armature 7 into its lowest magnetic resistance position, i.e. into the position in which it is displaced by 180° in comparison with the drawing. If a current is fed to the coil 4 while armature 7 is in the represented position, it is undefined in which direction armature 7 will be rotated because of the symmetry of the arrangement. This position therefore is labile, whereas the opposite position is stable.

Referring for the moment to FIG. 10, it will be seen that the amount of the electromagnetically produced torsional moment $M_e$ is qualitatively represented as a function of the measured rotational angle $\alpha$ measured with respect to the labile position (0°). The torsional moment first rapidly increases between 0° and 20°, beginning at zero, then remains nearly constant over a wide range and then again rapidly drops to zero between approximately 160° and 180°. The resistance which is to be overcome by the torsional moment imparter can originate from a torsional spring 22 schematically represented in FIG. 1 which tends to rotate armature 7 in the direction of the dotted arrow 23 in FIG. 2. A stop 24, represented schematically in FIG. 2, may be provided on one of the covers 3 or 3' and co-operates with a stop arm 25 also schematically represented in FIG. 2. The stop 24 is displaced against the labile position by an angle of approximately 20° or generally speaking 20/n degrees, and when the coil 4 is not excited, the stop arm 25 is in contact with stop 24. If the coil 4 is excited, the armature 7 is rotated in direction of arrow 26 by the electromagnetically produced torsional moment $M_e$. The torsional moment of the spring, $M_f$ is represented in FIG. 10 in the assumption that the spring, under the stop angle $\alpha_0$ has a linear pretension $M_{f0}$. It is apparent that the armature 7 will adjust to angle $\alpha_1$ where $M_e$ is equal to $M_f$, that is, where the spring force and the torsional moment induced by excitation of the coil are equal.

It will be understood that the curve $M_e$ is valid for a certain constant intensity of the exciting current, whereas, for a more intensive exciting current, the electromagnetically produced rotational moment $M_e'$ is, of course, greater. In the development of curve $M_e'$ (FIG. 10), which is represented by a dotted line, the armature 7 will adjust to rotational angle $\alpha_1'$. The torsional moment $M_e$ is approximately proportional in a wide current intensity range, and nearly constant in the range between approximately 20° and approximately 160°. This assures, contrary to the action of known torsional moment imparters, a well defined adjusted position of armature 7, because the inclination of the characteristic of the spring $M_f$ can be chosen so that a sliding or acute intersection with curves $M_e$, $M_e'$, etc. will never result. It is preferable also to provide a stop 27 for stop arm 25 in the final angular position $\alpha_e$ of about 160° or generally speaking 160/n degrees, so that the armature can only be rotated in the range between approximately 20 and 160°, in which the torsional moment $M_e$ or $M_e'$ etc. created by a constant exciting current is substantially constant.

The modification according to FIGS. 4–6 is different from that according to FIGS. 1–3 in that each cover 28 presents two distinct poles 29, and the armature 30 also presents two distinct poles 31 on each side. Both poles 29 of cover 28 which are displaced relatively to each other by 180° are separated from each other by two symmetrical milled openings of pole shoe 33 which projects into coil support 5 and forms those poles 29. The milled openings 32, the cross-section of which is of arcuate shape on its inward part, have uniformly the same depth. This form which is very practical in manufacture, however, is not absolutely necessary to the desired aim, just as neither the surfaces 17 and 19 need be plane in the case of FIGS. 1–3, but may, for example, be concave. It is important, however, that the poles 29, and their milled openings 32 each subtend an arc of approximately 90°. The poles 31 of armature 30 are also delimited by openings 34, the limit of which has a circular shape in cross-section, and the same is also true for the openings 34 as for openings 32. Both covers 28 are in exactly the same positions and therefore are not displaced angularly with respect to each other as covers 3 and 3'.

Referring now to FIGS. 4–6, an armature 30 is also shown in the labile position, and again stops 35 are provided which cooperate with a stop arm 37 fixed on shaft 9. These stops delimit, in the range of between 0° and 90°, a desirable range lying between $\alpha_0$ and $\alpha_e$, i.e., between approximately 10° and 80° in which the torsional moment $M_e$ is again practically constant when the exciting current is constant.

The execution according to FIGS. 7–9 is different from that of FIGS. 4–6 only in that each cover 28' has three distinct poles 29' which are again separated by three milled openings 32', whereby these poles 29' and milled openings 32' each subtend approximately 60°. Accordingly, armature 30' has three poles 31' on each side, which are separated from each other by milled openings 34' which also subtend approximately 60° each. The stops 35' and 36' which cooperate with stop arm 37' delimit, in the properly possible working range of between 0° and 60°, an appliable range between $\alpha_0$ and $\alpha_e$ of approximately between 7 and 53°.

It can be seen that in the same way electromagnets with more than three pairs of poles may be provided, whereby the working range becomes proportionately smaller. On the other hand, the torsional moment increases with the number of the pole pairs, the size of the electromagnet and of the armature remaining constant. Attention is drawn to the fact that the axis should be supported by both covers, e.g. 3 and 3', but it is sufficient to pass it only through one cover only to deliner the torsional moment to the exterior.

From the foregoing description it will be seen that I contribute a device of the class described which is relatively small and inexpensive, utilizes a coil that is simple to wind, and in which the armature, and its shaft, can be rotated with precision to a selected position within a given range of operation or movement.

I believe that the construction and operation of my novel electromagnetic control device will now be understood, and that the advantages of my invention will be fully appreciated by those persons skilled in the art.

I claim:
1. A control device of the class described comprising an electromagnetic having a coil and a ferromagnetic core including a sleeve surrounding said coil and end caps for closing the same, a rotatable shaft extending axially in said core and through at least one of said end caps, an armature fixedly mounted to said shaft, said armature having distinct surfaces opposed each of said caps, the opposing surfaces of said caps and armature each having $n$ distinct poles displaced thereabout every $360/n$ degrees relative to said shaft and shaped to provide an air gap configuration which produces upon constant excitation of said coil substantially constant torque over an extended range of shaft angular movement, spring bias means tending to prevent rotation of said shaft, stop means cooperable with said shaft for angularly positioning said armature and shaft in said extended range and for holding against the urging of said bias means whereby upon excitation of said coil said shaft will assume an angular position corresponding to where the electrically produced torque of said shaft equals the oppositely applied force of said spring means.

2. The device of claim 1 wherein said opposed surfaces each have one distinct pole extending substantially 180°, the remaining 180° of said surfaces of said armature and cap being obliquely inclined relative to the first mentioned surfaces, similar surfaces of opposed caps being displaced 180° relatively to one another.

3. The device of claim 2 characterized in that the oblique surfaces are concave.

4. The device of claim 1 wherein the distinct poles of each of said surfaces are separated by openings defined by a circular arc.

5. The device of claim 1 wherein said spring bias means urges said shaft to a position wherein the poles of the opposed surfaces are displaced relatively to each other by $360°/2n$ and said stop means maintains said shaft out of this position by an angle equal to at least $20/n$ degrees.

6. The device of claim 1 wherein second stop means is provided at $160/n$ degrees.

References Cited

UNITED STATES PATENTS

| | | | |
|---|---|---|---|
| 2,767,357 | 10/1956 | Naybor | 335—272 |
| 2,872,627 | 2/1959 | Buchtenkirch | 335—272 XR |
| 3,092,762 | 6/1963 | Roters et al. | 335—272 |
| 3,221,191 | 11/1965 | Cuches et al. | 335—272 XR |
| 3,278,875 | 10/1966 | McDonough | 335—272 |

GEORGE HARRIS, *Primary Examiner.*

U.S. Cl. X. R.

335—125